UNITED STATES PATENT OFFICE.

JOHANN SCHINDELMEISER, OF DORPAT, RUSSIA.

PROCESS FOR REFINING RAW UNREFINED PINE-OIL, TURPENTINE-OIL, AND THE LIKE.

1,068,174.

Specification of Letters Patent.

Patented July 22, 1913.

No Drawing.

Application filed August 7, 1912. Serial No. 713,865.

*To all whom it may concern:*

Be it known that I, JOHANN SCHINDELMEISER, professor of chemistry at the University of Dorpat, a subject of the Russian Czar, residing at Dorpat, in Livland, Russia, have invented certain new and useful Improvements in Processes for Refining Raw Unrefined Pine-Oil, Turpentine-Oil, and the Like; and I do hereby declare the following to be a full, clear, and exact description of the invention, such as will enable others skilled in the art to which it appertains to make and use the same.

This invention relates to a process for refining raw unrefined pine oil, turpentine oil, and the like, and more especially oils of Russian or Finnish origin, and, generally speaking, all the oils which are obtained by the dry distillation of the wood and roots of the coniferous trees, especially different kinds of firs, which oils are used as a substitute for the genuine oil of turpentine obtained from various conifers, such as *Pinus australis*, *Pinus palustris* and *Pinus Tæda*.

In the specification of my British Letters Patent No. 14315 of 1911, a process is described in which the raw pine oil is heated with aqueous or gaseous ammonia under pressure or subjected to prolonged heating in a vessel provided with a reflux-condenser.

According to the present invention, a cyanid is used in addition to the ammonia, whereby an improved result is obtained.

The following is an example of the manner of carrying out the improved process. 200 kilograms of raw oil are mixed with 15 kilogs. of ammonia having a specific gravity of 0.910, or with 2 kilogs. of gaseous ammonia. A cyanid is then added, such as cyanid of potassium, sodium, ammonium, or the like, the quantity of cyanid being based on the quantity of ammonia used the amount of which may vary between 75 to 150 grams. The mixture is heated at a temperature of from 140 to 160 degrees centigrade in an autoclave or digester under a pressure of 3 atmospheres during from 3 to 4 hours, or less according to the nature of the impurities. The quantity of impurities and the duration of the treatment have to be ascertained by means of a previously made test. In some cases a prolonged heating in a vessel provided with a reflux-condenser will be sufficient. The unaltered pinene is then separated by distillation and washing from the impurities which have been converted into non-volatile compounds. The effect of the cyanid salts employed has been determined empirically by experimentation.

I claim:

1. A process for refining raw pine oil, turpentine oil and other oils of the conifers, which consists in heating the oil with ammonia with the addition of a cyanid and then separating by distillation the unaltered pinene from the impurities which have become converted into non-volatile compounds.

2. A process for refining raw pine oil, turpentine oil and other oils of the conifers, which consists in heating the oil under pressure with ammonia with the addition of a cyanid and then separating by distillation the unaltered pinene from the impurities which have become converted into non-volatile compounds.

In testimony, that I claim the foregoing as my invention, I have signed my name in presence of two subscribing witnesses.

JOHANN SCHINDELMEISER.

Witnesses:
  WOLDEMAR HAUPT,
  HENRY HASPER.